W. F. LEE.
AUTOMOBILE WHEEL HUB.
APPLICATION FILED MAR. 28, 1917.
1,252,455.
Patented Jan. 8, 1918.
2 SHEETS—SHEET 1.
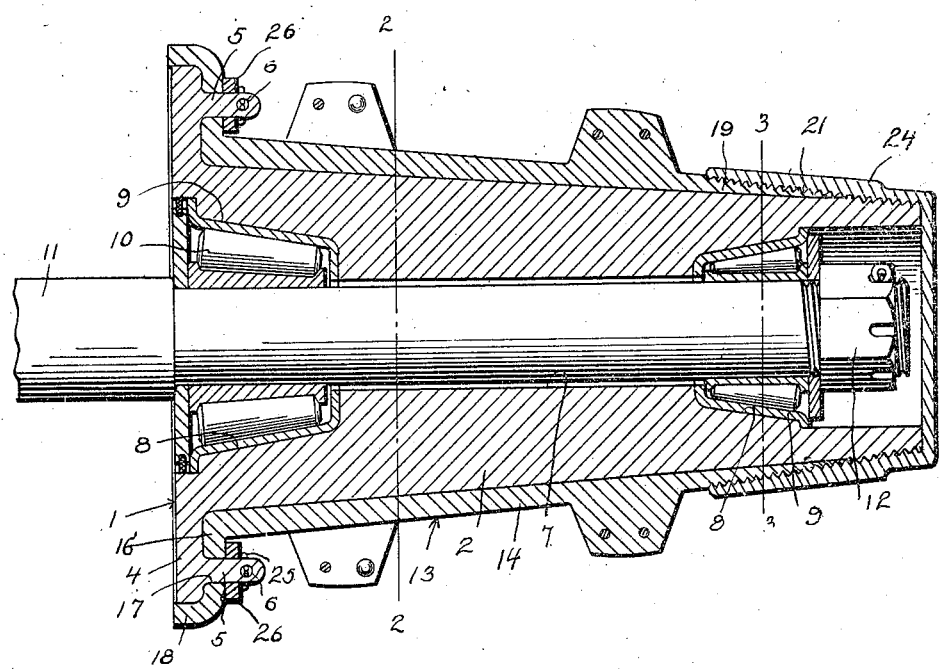
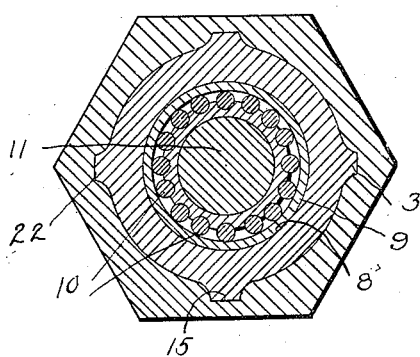
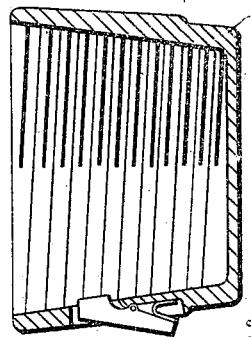

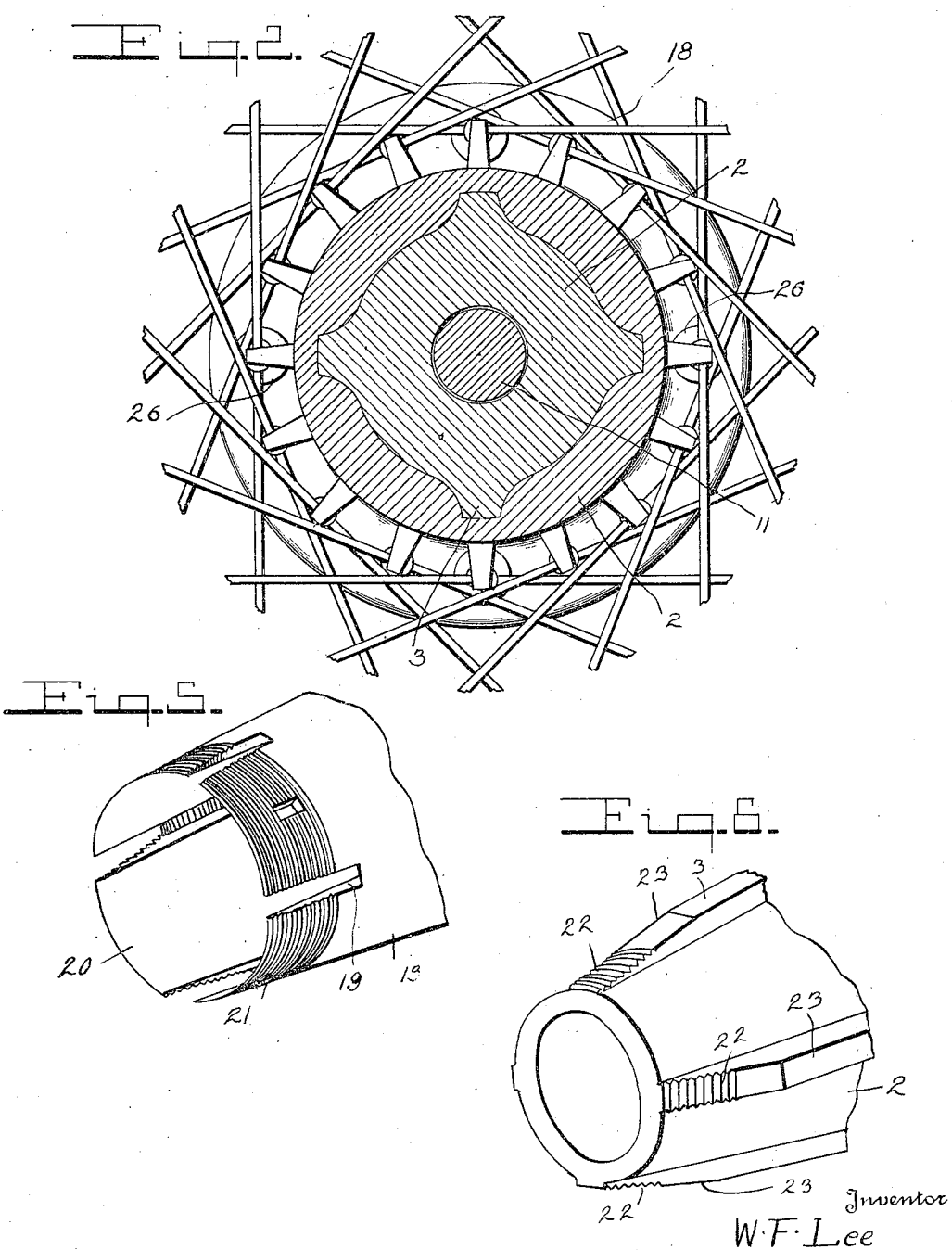

UNITED STATES PATENT OFFICE.

WILLIAM F. LEE, OF SYRACUSE, NEW YORK.

AUTOMOBILE-WHEEL HUB.

1,252,455.  Specification of Letters Patent.  Patented Jan. 8, 1918.

Application filed March 28, 1917. Serial No. 158,007.

*To all whom it may concern:*

Be it known that I, WILLIAM F. LEE, a citizen of the United States, residing at Syracuse, in the county of Onondaga and State of New York, have invented certain new and useful Improvements in Automobile-Wheel Hubs; and I do hereby declare the following to be a full, clear, and exact description of the invention, such as will enable others skilled in the art to which it appertains to make and use the same.

This invention relates to new and useful improvements in hubs for motor vehicles and the principal object of the invention is to provide a hub which will allow the wheel structure to be removed from the hub mounting and spindle in order to provide a demountable wheel.

Another object of the invention resides in the provision of an outer hub which is interlocked with an inner hub and held thereon against accidental removal by the hub cap.

A further object of the invention is to provide an inner hub mounting which has ribs for engaging the outer hub shell in order to interlock so that relative rotation of the two parts will be prevented.

A further object of the invention is to provide suitable auxiliary studs which will also prevent the outer hub shell from demounting should the hub cap loosen and come off.

With the above and other objects in view, the invention consists in the novel combination and arrangement of parts which will be fully set forth in the following specification and accompanying drawings, in which:—

Figure 1 is a sectional view through a hub constructed in accordance with this invention;

Fig. 2 is a transverse section on line 2—2 of Fig. 1;

Fig. 3 is a transverse section on the line 3—3 of Fig. 1;

Fig. 4 is a vertical sectional view of the wheel hub; and

Fig. 5 is a fragmentary detail perspective view of the outer hub structure.

Fig. 6 is a view illustrating the inner hub.

Referring to the drawings, 1 designates as an entirety the inner hub structure consisting of a frusto-conical body 2 formed with a plurality of longitudinal ribs 3 which extend radially from the surface thereof, as clearly illustrated in the drawings. This body 2 is provided at its enlarged end with a flange 4 having a plurality of outwardly extending studs 5 formed on its outer face, which studs are apertured as at 6 for a purpose to be more fully hereinafter described. The frusto-conical body 2 is provided with a longitudinal bore 7 formed adjacent opposite ends with enlarged bores 8 into which bearing cups 9 are fitted as will be clearly seen upon reference to Fig. 1. The bearing cups are adapted to receive roller bearings 10 which run on a suitable spindle 11 which is threaded at one end and provided with a nut 12 and cotter pin by means of which the inner hub structure is held against accidental removal from the spindle.

The outer hub structure is designated generally by the numeral 13 and comprises a frusto-conical shell 14 having formed therein a plurality of longitudinal grooves 15 arranged on the inner side of the shell for the reception of the ribs 3 of the inner hub structure previously described. Formed at the enlarged end of the shell 14 is a flange 16 provided with a plurality of spaced apertures 17 arranged in annular series for the reception of the studs 5. A suitable cover flange 18 is formed at the periphery of the flange 17 and overlies the flange 4. For the sake of appearance, it will be understood that the same may come flush, or rise above the flange 4, at the desire of the user. As illustrated in Fig. 5, the grooves form at the reduced end of the hub shell slots 19 the walls of which taper so that the outer portions of the ribs 3 at the reduced end of the hub shell will be exposed. As illustrated in Fig. 5, the slots 19 form a plurality of fingers 20 which are externally screw threaded as at 21 and which threads are adapted to aline with threads 22 formed on the inclined outer faces 23 of the ribs 3, previously described. The inclined outer faces above described are formed at the outer terminal of the inner hub structure and it will be seen that when the hub elements are assembled the ribs will extend into the grooves thereby forming an interlock which will prevent relative rotation of the two separate sections and after the hub elements have been assembled, the hub cap designated by the numeral 24 is threaded onto the fingers 20 and the threads 22 of the faces 23 of the ribs 3, thereby also interlocking the two elements in such a manner as to prevent relative rotation and accidental removal of the parts. In order to further guard against accidental removal of the parts the studs 5 have fitted therein suitable cotter pins 25. It will be understood that instead of the cotter pin structure any suitable locking means may be substituted on the studs 5 without departing from the spirit and scope of this invention.

As shown in the drawings, the spokes extend through openings formed in radiating supports formed on the periphery of the outer hub element and these supports may take the form of teeth formed integrally with the hub, corrugations or studs which are threaded into the hub. The hub cap previously mentioned is provided with a lock as shown in Fig. 1 by means of which the same is secured against rotation thereby also firmly locking the parts against movement and avoiding any danger of the hub cap being loosened and coming off.

While in the foregoing there has been shown and described the preferred embodiment of this invention, it is to be understood that such changes may be made in the combination and arrangement of parts as will fall within the spirit and scope of the appended claims.

What is claimed is:—

1. In a hub, an inner hub structure, an outer hub structure, a plurality of radiating ribs formed on the inner hub structure, the outer hub structure having grooves to receive the ribs, said outer hub structure also having slots adjacent its outer end, said slots alining with the grooves and forming fingers, the ribs being provided with inclined faces adjacent their outer ends, screw threads formed on the fingers and the inclined faces of the ribs, and a hub cap adapted to be threaded on the threads whereby the hub structures are held in intermeshing engagement and against accidental movement.

2. In a hub, an inner hub structure, an outer hub structure having grooves opening out in slots in the outer end thereof, ribs formed on the inner hub structure and fitting in the grooves and extending through the slots, and a cap threaded to the outer hub structure and to the ribs extending through the slots.

In testimony whereof I affix my signature in presence of two witnesses.

WILLIAM F. LEE.

Witnesses:
FRANCIS J. SNYDER,
ALBERT E. SNYDER.